Sept. 15, 1959  A. E. PASCHKIS  2,904,734
BALANCE INDICATOR FOR REBALANCEABLE SYSTEMS
Filed Sept. 5, 1957  3 Sheets-Sheet 2
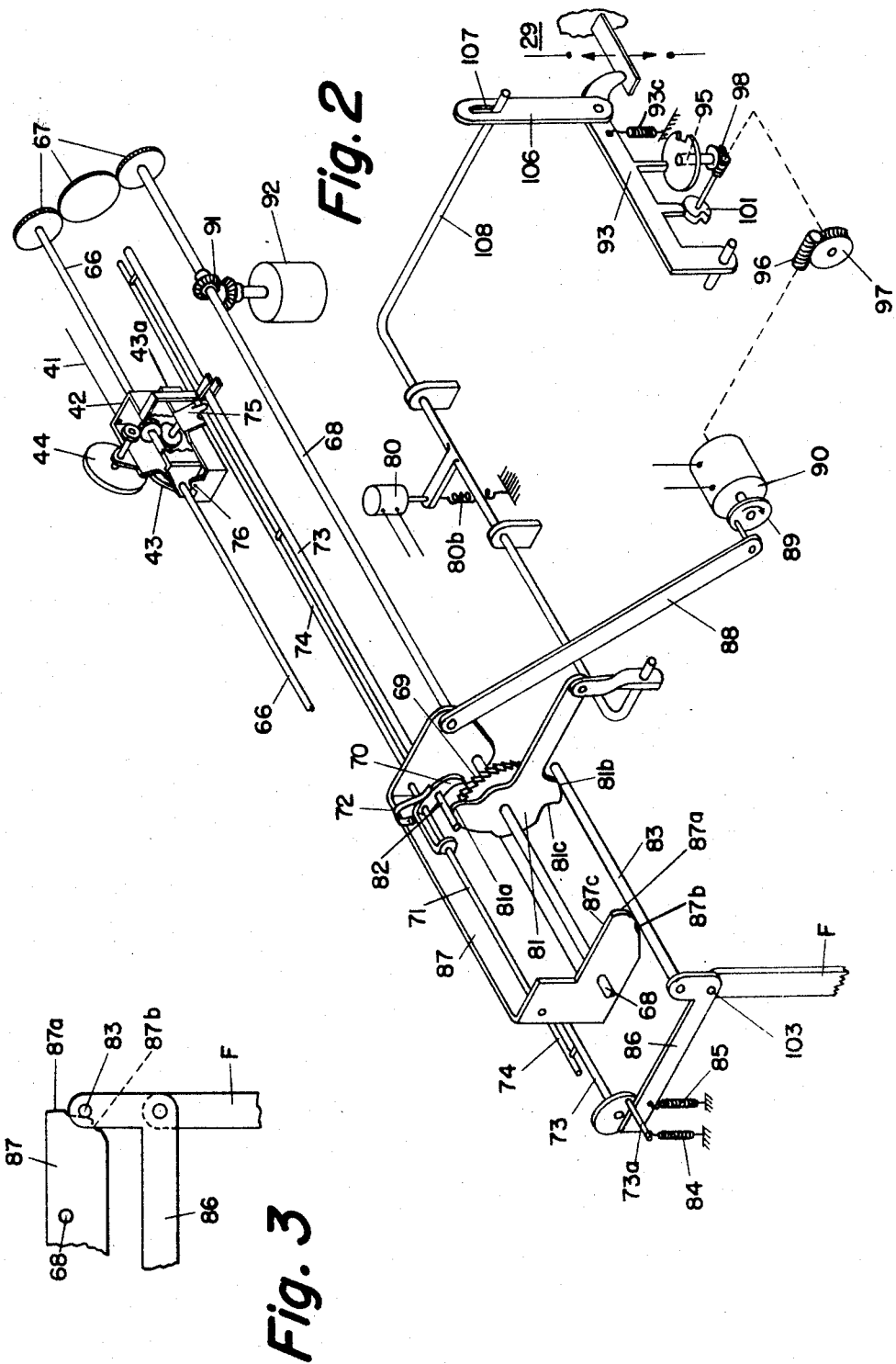

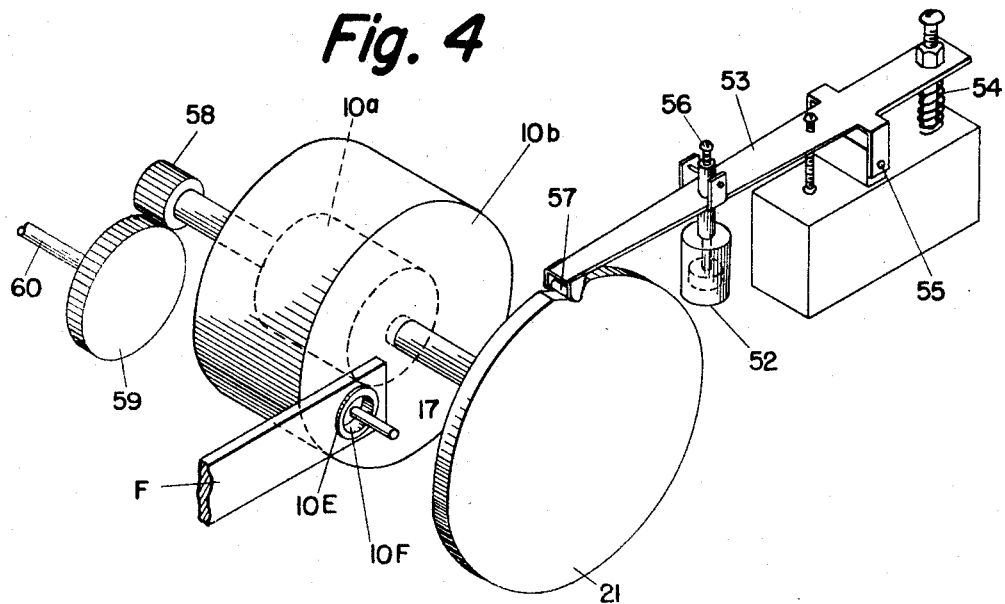

United States Patent Office 2,904,734
Patented Sept. 15, 1959

2,904,734

BALANCE INDICATOR FOR REBALANCEABLE SYSTEMS

Albert E. Paschkis, Ambler, Pa., assignor to Leeds and Northrup Company, Philadelphia, Pa., a corporation of Pennsylvania Application September 5, 1957, Serial No. 682,201

10 Claims. (Cl. 318—28)

This invention relates to balanceable systems of the type which are unbalanced in response to change in the magnitude of the condition and which are rebalanced in order to provide a measurement of the magnitude of the condition.

When a plurality of condition-responsive devices are connected in sequence to a measuring system it has been customary to provide a predetermined time for the measuring system to reach balance for each condition under measurement. This has necessarily delayed reading out the magnitude of the condition, particularly when the system may be in balance within a fraction of the total time allotted for the balancing operation. To reduce the relays incident to the use of fixed balancing periods, it has been proposed to utilize relays arranged to respond to conditions of balance and to indicate attainment of balance. Inasmuch as a balancing motor normally drives a pen or printing mechanism relative to an associated scale and chart, it has been further proposed that when such indicating mechanism has been at standstill for a given length of time after being moved from one position to another, that this standstill period be utilized as an indication that the measuring system is rebalanced.

It is an object of the present invention to provide an indication that a rebalanceable system has been balanced by utilizing the decrease, i.e., the disappearance, of reaction torque developed upon the stator of the balancing motor as an indication that balance has been attained. More particularly, the stator of the balancing motor is pivotally supported so that it can more between predetermined limits in response to reaction torque produced upon energization of the motor. The stator is biased to a neutral position. Thus, as the reaction torque is decreased to a predetermined low value closely corresponding to the torque developed as the balance point of the system is attained, the stator position is utilized for a signal that the system is in balance and that the magnitude of the condition may then be recorded or read-out, as may be desired.

For further objects and advantages of the invention, and for preferred embodiments thereof, reference is to be had to the following detailed description taken in conjunction with the accompanying drawings, in which:

Fig. 1 diagrammatically illustrates a part of a balancing system to which the invention has been applied;

Fig. 2 illustrates in perspective, details of a mechanism with which the invention may be utilized and part of which is shown in Fig. 1;

Fig. 3 is an end elevation of a part of the mechanism of Fig. 2; and

Fig. 4 is a enlarged perspective view of part of the system of Fig. 1 and including several modified structures.

Figure 1:
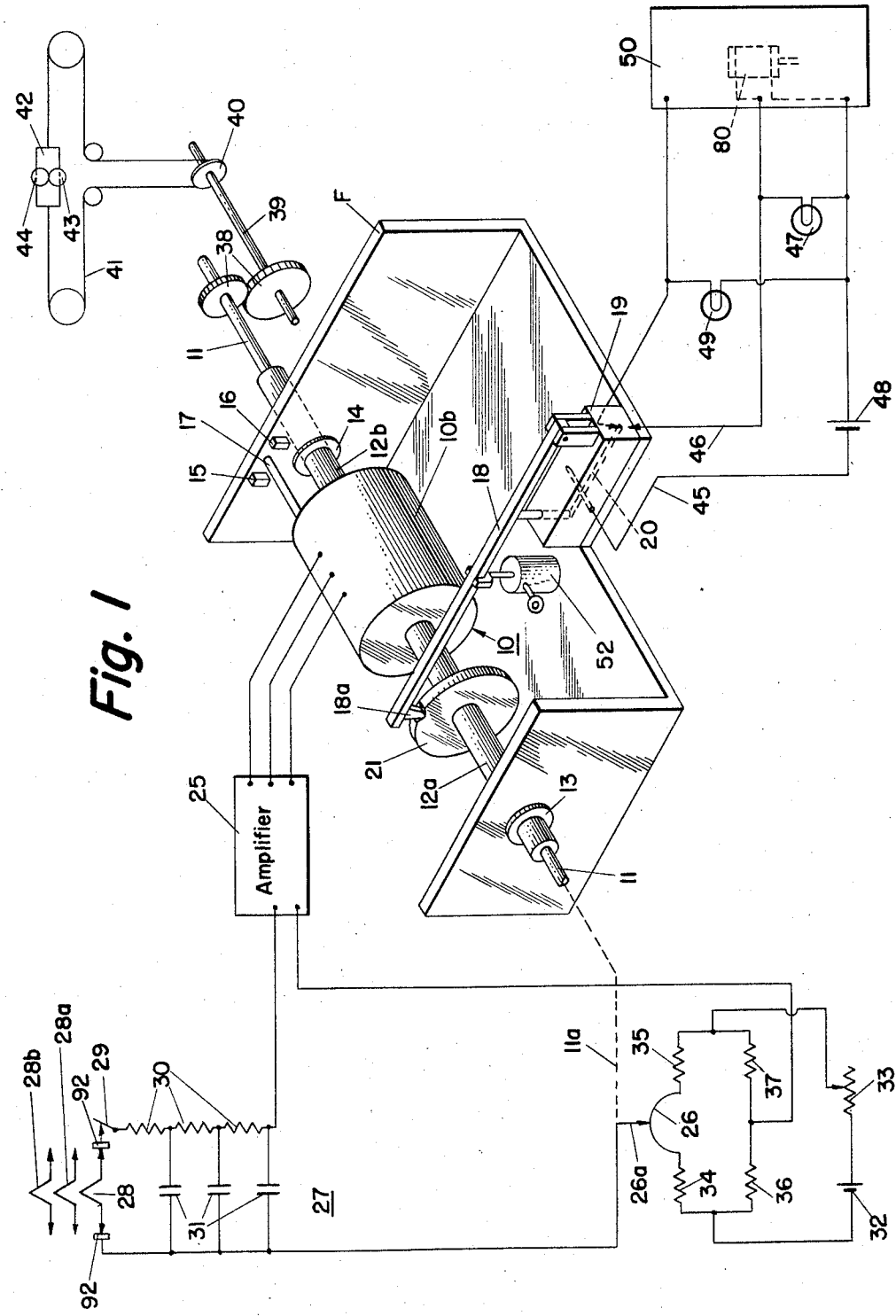

Referring to the drawings, the invention in one form has been shown as applied to a balancing motor 10, Fig. 1, having a rotor carried by a shaft 11, journaled within bearings 12a and 12b which are secured to the stator 10b and rotatably supported in stationary bearing elements 13 and 14. Rotation of the stator 10b is limited by means of stationary stops 15 and 16 between which extends an arm 17 secured to the stator 10b. The stator is normally biased to a neutral position, the one illustrated, by means of the downward force exerted on a cam follower 18a by a spring-biased lever 18 which is supported from the housing 19 of a switch 20. The cam follower 18a is illustrated in its neutral or lowermost position in a V-notch of a cam 21.

The system-balancing motor 10 is energized under the control of an amplifier 25, having included in its input circuit a vibrator, such for example, as the type disclosed in Williams Patents Nos. 2,657,349 and 2,113,164. The motor 10 is energized for rotation in a direction which through the shaft 11 and the mechanical connection 11a produces relative movement between a slidewire 26 and its contact 26a in a direction to decrease any unbalance existing in a balanceable network or system 27. The balanceable circuit 27 includes a condition-responsive device 28, shown as a thermocouple, which through a standardizing switch 28 is connected to the input of the amplifier 25. Preferably, as explained in said Williams Patent No. 2,657,349, a filtering network including resistors 30 and capacitors 31 is included in the input circuit of the amplifier 25. Details of the standardizing circuit have been omitted, these being fully disclosed and described in said Williams Patent 2,657,349.

The voltage developed by the thermocouple 28 will be proportional to the temperature to which it is exposed. That voltage is balanced by that fraction of the voltage or potential difference across the slidewire 26 determined by the position of the contact 26a. Any difference between the voltage introduced by thermocouple 28 and that derived from slidewire 26 is applied to the input of the amplifier 25. If the difference be in one direction, the motor 10 will be energized for rotation to move the slidewire contact 26a in the direction which will decrease that difference. If the difference voltage be in the opposite direction, the rotation of the motor will be reversed. Again, slidewire contact 26a moves in direction to reduce the difference.

The potential difference across, or the voltage developed by, the slidewire 26 arises by reason of current flow through slidewire 26, as from a source of supply such as a battery 32 in series with a current-adjusting rheostat 33.

The measuring slidewire 26 has in series therewith resistors 34 and 35. In shunt with the branch including resistor 34, slidewire 26 and resistor 35, is the supply branch which includes resistors 36 and 37. One of these may have a substantial temperature coefficient of resistance to introduce a correction for the thermocouple characteristics, more particularly, for cold junction compensation. For details of such a compensating system, see Wunsch Patent No. 1,199,724.

Assuming now that the temperature to which the thermocouple 28 responds differs from the preceding thermocouple temperature, there is produced a signal representative of the unbalance of the system. This signal is applied to the amplifier 25 which produces energization of the motor 10 to rotate or move the contact 26a of the slidewire 26 in a circuit-balancing direction. At the same time, through gearing 38, a shaft 39 drives a pulley 40 and a belt or violin string 41 for translation of a recorder-carriage 42 relative to a recording chart (not shown). Structural details of a suitable recorder are shown in Ross et al. Patent No. 2,113,069. The carriage 42 has a printwheel 43 and an ink wheel 44. As previously explained, it is desired to actuate the printwheel 43 to place a record on the chart as soon as balance has been attained.

Immediately upon energization of motor 10 to initiate the system-balancing operation, the stator 10b is subjected to a reaction torque which moves it in a direction opposite to the direction of rotation of the rotor. For example, the stator 10b may be assumed to move in a counterclockwise direction to move the pin 17 against a stationary stop 15. These stops are shown a substantial distance apart for purposes of clarity in the drawing. Actually, they will be but a few degrees apart so that the extent of movement of the stator is quite limited. Since the cam 21 is secured to the bearing 12a, spring pressure exerted on lever 18 biases the cam follower 18a against the right-hand surface of the V-notch to produce a torque tending to rotate the stator 10b in a clockwise direction. The movement of the cam follower 18a upwardly along the right-hand cam surface, as viewed in Fig. 1, causes the arm 18 to be lifted. Accordingly, the switch 20 is actuated to complete a circuit between conductors 45 and 46. The switch 20 is of conventional construction with the movable contact spring-biased to the illustrated position. The circuit which is closed in response to the stator torque is utilized to energize a signal lamp 47 as from a battery 48 to indicate that the measuring system is unbalanced.

Rise of the cam follower along the cam surface not only increases the force applied by the spring-biased lever 18, but it also increases the moment arm which develops a restoring torque on bearing 12a and stator 10b.

As the motor 10 drives the contact 26a toward a system-balancing position, the torque of the motor is rapidly decreased until at the balance point, it is, of course, zero or of a negligibly low value. Accordingly, with application of a suitable bias on the restoring cam 21 (determined as by selection of the size of the spring in switch 20), the stator is returned to its illustrated neutral position when the motor torque has been reduced to a value indicative of the final balance of the measuring system. When this occurs, the cam follower 18a resumes its position in the trough of the cam 21 and the switch 20 is spring-actuated to the illustrated position for energization of the signal lamp 49 which advises the operator that the measuring system is in balance. If desired, the circuits from the switch 20 may be utilized through suitable mechanism 50 (including, for example, a solenoid 80) to produce operation of the printwheel 43, to provide audible signals, or to control read-out circuits provided in digital types of measuring systems.

After the system has been rebalanced in measurement of the magnitude of the condition, as for example, the temperature of thermocouple 28, a stepping switch, symbolically indicated by the arrow-contacts on the thermocouples, is operated to connect a second thermocouple 28a into the measuring circuit. This thermocouple may be exposed to the outside temperature of an airplane which can be hundreds of degrees lower than that of one of the temperatures existing at part of the propelling motor, and to which thermocouples 28 and 28b respond. This means that an input signal of very large magnitude will be applied to the amplifier 25 upon operation of the selector switch. Accordingly, the motor 10 will receive maximum energization for maximum speed of rotation. The result is the immediate development of a relatively large reaction torque on the stator 10b. In order to assure stability (prevent bouncing) with suddenly developed reaction torques of large magnitude, the stops 15 and 16 may be made of resilient material, or they may be cushion-mounted. In addition to providing cushion-stops, and also as an alternative arrangement, the spring-biased arm 18 may have associated with it a dashpot 52, which can be adjusted by a handle, as illustrated, to provide selected magnitudes of damping.

The dashpot 52 has the additional function of eliminating false balance signals due to the occurrence of a reversal in motor torque which can and frequently does occur as the motor 10 drives the slidewire contact 26a to its final system-balancing position. This will be readily understood when it is realized that the filter network including the capacitors 31 introduces a damping action into the operation of the motor 10 by producing a virtual balance point which occurs ahead of the actual balance point. Thus, with the motor rotating at substantial speed, when the virtual balance point is attained, there is a reversal of motor torque which acts quickly to bring the rotor to standstill, and at about the time the contact 26a arrives at its true circuit-balancing position, i.e., the balance point. Preferably, the damping means, whether electrical or mechanical, or in the form of the dashpot delays completion of the circuit to the solenoid 80 for a short interval by reason of its delay in the movement of the follower into the trough of the cam 21. As will later be explained, the momentary delay introduced avoids operations in response to transitory balanced conditions.

Referring now to Fig. 4, it is to be noted that the lever 53 differs somewhat from arm 18 and that a separate, adjustable coil spring 54 biases the lever for counterclockwise rotation about its pivot pin 55 which supports the lever 53. It will be noted that the dashpot 52 (shown more in detail) includes an adjusting screw 56 which controls a needle valve for varying the effectiveness of the dashpot, i.e., the rate of flow of fluid from one side of the piston to the other. The cam follower in Fig. 4 comprises a roller 57 which rides in the V-shaped notch of the cam 21.

Instead of the stops of Fig. 1, the restraining means for the stator 10b comprises an opening 10F in the frame member F which, as illustrated, may include a liner 10E of resilient material, such as cork, one of the synthetic resins, or soft rubber. The rotor 10a through a driving gear 58 and a driven gear 59 drives a shaft 60 which corresponds with the shaft 39 of Fig. 1. The rotor 10a is shown as of the squirrel cage type.

Referring now to Figs. 2 and 3, the invention has been illustrated as applied to the indicating, recording and/or controlling apparatus of said Ross et al. Patent No. 2,113,069, dated April 5, 1938. As shown in Fig. 2, a carriage 42 for the inking wheel 44 and the printwheel 43 is slidably mounted on a shaft 66 driven through gearing 67 by a driving shaft 68 actuated through a ratchet wheel 69 and a pawl 70 pivotally mounted on a shaft 71 and biased toward the ratchet wheel 69 by a spring 72. The carriage 42 is driven by the motor 10 shown in Fig. 1 through the violin string 41, a part of which appears in Fig. 2. As explained in said Ross et al. patent, when a printing operation is to be effected, rotation of a shaft 73 is produced which, through an auxiliary actuating rod 74 and a frame actuating element 75, rotates the printwheel frame 43a about its pivots 76 to move the printwheel into printing engagement with the chart.

In accordance with the present invention, printing cannot occur as long as the solenoid 80 is energized. This solenoid 80 is shown in the box 50 of Fig. 1, and it will be seen that it is energized whenever the measuring circuit is unbalanced and there is present the reaction torque on the stator 10b of motor 10.

The energization of the solenoid 80, Fig. 2, holds one surface 81a of a double cam element 81 in a position with respect to a pin 82 carried by the pawl 70 to prevent movement of the pawl into operating relation with the ratchet wheel 69. A second cam surface 81b is held in a position with respect to rod 83 to prevent movement of a crank 86 upon its release by cam surface 87b of frame extension 87c.

A crank 89 driven by a motor 90, which can be the driving motor for the chart of the indicating-recording instrument, through a link 88 rotates the frame 87 back and forth on the shaft 68 on which it is freely pivotally supported.

First considering the movement of the pawl 70 as the frame 87 is rocked to and fro, it is to be noted that the pin 82 will move along the upper cam surface 81a and will eventually move downwardly toward shaft 68. This downward movement occurs as the crank 89 through link 88 brings the frame 87 to its maximum clockwise position. Thus the pawl 70 does not produce any rotation of ratchet wheel 69 and of shaft 68 to which that wheel is secured. As the frame 87 moves in a counterclockwise direction, the pin 82 rides upwardly along the cam surface 81a.

Now considering the cam surface 87a, as the frame 87 moves in a clockwise direction, the outmost end 87a of the cam surface engages the rod 83 and imparts to the crank 86 pivoted at 103 a slight clockwise rotation. This rotation, acting through pin 73a forming part of a crank, rotates shaft 73 in a counterclockwise direction. Accordingly, the operating rod 74 is moved downwardly and through the driving connection 75 rotates the printwheel frame 43a in a clockwise direction to move the printwheel upwardly into inking engagement with the inking wheel 44. The latter wheel includes a plurality of inking pads which, in turn, engage corresponding printing characters on the print wheel. Though the speed of motor 90 is relatively high, around 120 r.p.m., the inking pads do not apply an excessive amount of ink to the printwheel characters, but instead assures that they are always properly inked for printing.

It will now be assumed that the measuring system has been balanced, that the torque has substantially disappeared from the stator of motor 10 and that the switch 20 has opened the circuit to the solenoid 80. Deenergization of solenoid 80 produces operation of the record-producing means in the manner hereinafter described. The control cam 81 is thereupon freed for rotation in a counterclockwise direction. Though gravity may, in general, provide an adequate biasing force for this operation, a spring 80b may also be utilized. If at the instant of rebalance of the measuring system, the frame 87 be in the position illustrated (its maximum counterclockwise position), the rod 83 will be in engagement with the cam surface 81b. So will the pin 82 be in engagement with the cam surface 81a. Accordingly, the cam 81 cannot rotate in a counterclockwise direction, notwithstanding the deenergization of the solenoid 80. However, the frame 87 is rotated in a clockwise direction by the crank 89 with the cam 81 remaining in the illustrated position. It remains in that position until the frame 87 approaches the limit of movement in the clockwise direction, at which time the crest 87a on the cam surface engages the rod 83 to rotate the crank 86 in a clockwise direction and to move the pin 83 outwardly and away from the cam surface 81b. The cam 81 is then free for rotation in a counterclockwise direction under the influence of gravity and of the spring 80b. During the time the cam 81 is being moved to the releasing position, the crank 86 through a crank including pin 73a and shaft 73 actuates rod 74 in a counterclockwise direction. The counterclockwise motion of rod 74 through connection 75 rotates printwheel carrying frame 43a in a clockwise direction to move the printwheel against the inking wheel 44. This action is momentary since the movement of frame 87 immediately reverses. As the crest 87a of the cam is moved upwardly away from pin 83, that pin engages the inclined or recessed surface 87b and is thus free to permit rotation of the crank 86 in a counterclockwise direction to initiate the printing operation. The printing operation is produced by the action of the springs 84 and 85. The spring 84 rotates the shaft 73 in a clockwise direction, and the resultant clockwise movement of the shaft 74 actuates the printwheel through the connection 75 and the frame 43a for rotation in a counterclockwise direction about the pivots 76 for rotation of the printwheel downwardly into engagement with the chart. This is a fairly rapid operation to insure a distinctive and legible impression of the character on the chart.

From the foregoing, it will be seen that each printing operation occurs as the frame 87 begins its counterclockwise rotation. In this manner, there is avoided any possibility that the pawl 70 will actuate the ratchet weel 69 prior to printing. Upon completion of the counterclockwise rotation of the frame 87, the pawl 70 drops behind a tooth of the ratchet wheel 69, and during the subsequent clockwise rotation of frame 87 rotates ratchet wheel 69 and the shaft 68 to which it is attached. This shaft through gears 91 actuates the selector switch 92 and connects the next thermocouple 28a, Fig. 1, into the measuring circuit, and at the same time through gear 67, shaft 66 and the gears carried by frame 65 rotates the printwheel and the inking wheel 44 to their next positions. It will be remembered that the cam 81 was moved to its extreme counterclockwise position upon initiation of the printing operation. This movement moved the cam surface 81a to a position located counterclockwise of the location of pin 82. Thus, as the frame 87 completes its counterclockwise movement, the pawl 70 is free to be moved by spring 72 behind a tooth of the ratchet wheel 69 as just described.

The connection of a new thermocouple into the measuring circuit will in practically every occasion result in unbalance of that circuit and the production of torque on the stator. Accordingly, the solenoid 80 will be immediately energized to rotate the cam 81 into the illustrated print-lockout position.

Should an unbalance occur in respect to the condition measured by the thermocouple 28, Fig 1, before the aforesaid printing operation has taken place and after the cam 81 has been shifted to its releasing position, the arrangement is such that the printing operation will take place. It will take place since energization of solenoid 80 will be in effective to rotate cam 81 to the lockout position. The cam surface 81c is so shaped as to prevent the return of the parts to the illustrated positions until after the pin 83 has been moved to the illustrated position by the action of surface 87a.

Though not essential to the present invention, there has been shown in Fig. 2 a standardizing mechanism including the arm 93 corresponding with the arm of that reference character in said Ross et al. patent. This arm functions in association with the cams 95 and 101 of said patent, together with the associated gearing 98, 96, 97 driven from the chart motor 90. In the event a standardizing operation is initiated by the operation of said cams 95 and 101, a link 106 is moved downwardly. This link has a slot 107, the upper end of which will then engage an extension of the lockout lever 108 which is actuated by the solenoid 80 for rotation of the cam 81. Thus, a spring 93c will be effective through link 106 to hold the cam 81 in the illustrated lockout position, notwithstanding deenergization of the solenoid 80. Upon completion of the standardizing operation, if the system then be in balance and the solenoid deenergized, the return of the lever 83 and the link 106 to the illustrated positions will initiate the printing operation which will be effected in the manner above described.

Now that the principles of the invention have been set forth, it is to be understood that variations may be made within the scope of the invention as covered by the appended claims. For example, the stator 10b may be biased to a neutral position by centering springs applied directly thereto instead of the cam and follower arrangement which has been described. In that event, the cam 21 is to be taken as the representation of a commutator of insulating material with conducting means in the location of the trough now illustrated in the cam. When the stator is in its neutral position, an electrical circuit can be completed or broken, as may be desired, to indicate attainment of balance and to indicate when the balanceable system is unbalanced. The solenoid 80 may be applied to operate the printing mechanism directly as by connecting it to the crank 73a of Fig. 2 with omission of the crank 86 and the associated mechanism. In such a case, a second solenoid would be utilized to advance the print-wheel and the stepping switch 92.

What is claimed is:

1. The combination with a balanceable system having a movable element which upon unbalance of the system is movable to a system-balancing position, of a motor having a rotor, a driving connection between said rotor and said element, means for controlling the energization of said motor in response to unbalance of the system for moving said element to said system-balancing position, means supporting the stator of said motor for displacement from a neutral position whenever said motor is energized, and means responsive to return of said stator to said neutral position for indicating said system has been rebalanced.

2. The combination of claim 1 in which said stator is biased to said neutral position for movement thereto upon reduction of motor torque below a predetermined value after energization for rotation in either direction.

3. The combination of claim 1 in which there is associated with said stator a cam with surfaces sloping upwardly from both sides of a depression, a cam follower disposed between said surfaces, a spring applying a force biasing said cam follower against said surfaces for development of a restoring torque on said stator for movement thereof to a neutral position corresponding with a location of said cam follower intermediate said surfaces.

4. The combination of claim 3 in which a switch is associated with said spring and is operable from one circuit-controlling position to a second controlling position each time there is relative movement between said cam and said cam follower which displaces said cam follower from said neutral position.

5. In a recorder of the type in which a record is made of the magnitude of a condition by the actuation of record-producing means, the combination of a balanceable-measuring circuit, said circuit including an adjustable impedance, a motor, means including a motor responsive to unbalance of said circuit for adjusting said impedance in a direction to balance said circuit, said motor having a stator, means for pivotally mounting said stator for limited movement relative to its rotor, the reaction torque on said stator upon energization of said motor being effective to move it from a neutral position, said reaction torque varying from a position-changing value on said stator upon energization of said motor to a lower value as circuit balance is attained, and means responsive to return of said stator to its neutral position for controlling actuation of the record-producing means.

6. The combination with a motor having a rotor and a stator, of bearing means supporting said rotor for rotation and for supporting said stator for rotation, stops restricting the rotation of said stator through a small angle, biasing means for biasing said stator to a neutral position upon movement therefrom in either direction by reaction torque developed upon energization of said motor, a balanceable circuit having an element operable in response to change in the magnitude of said condition for unbalancing said circuit, said circuit having an element adjustable for rebalancing said circuit, a driving connection between said rotor and said element, means responsive to unbalance of said circuit for energizing said motor to drive said element in a circuit-balancing direction, the reaction torque on said stator moving it from its neutral position upon said energization of said motor, and means responsive to return of said stator to its neutral position for indicating attainment of circuit-balance.

7. The combination with a balanceable system having a movable element which upon unbalance of the system is movable to a system-balancing position, of a motor having a rotor, a driving connection between said rotor and said element, means for controlling the energization of said motor in response to unbalance of the system for moving said element to said system-balancing position, means pivotally supporting the stator of said motor for displacement from a neutral position whenever said motor is energized, biasing means for exerting a restoring force on said stator in a direction to return it to its neutral position, means for indicating arrival of said element in a system-balancing position, and means for momentarily delaying operation of said last-named means to avoid indications of transient circuit-balancing conditions.

8. The combination with a motor having a rotor and a stator, of bearing means supporting said rotor for rotation and for supporting said stator for rotation, stops restricting the rotation of said stator through a small angle, biasing means for biasing said stator to a neutral position upon movement therefrom in either direction by reaction torque developed upon energization of said motor, a balanceable circuit having an element operable in response to the change in the magnitude of the position for unbalancing said circuit, said circuit having an element adjustable for rebalancing said circuit, a driving connection between said rotor and said element, means responsive to unbalance of said circuit for energizing said motor to drive said element in a circuit-balancing direction, the reaction torque on said stator moving it from its neutral position upon said energization of said motor, means responsive to return of said stator to its neutral position for indicating attainment of circuit balance, and means for momentarily delaying operation of said last-named means to avoid indications of transient circuit-balancing conditions.

9. In a recorder of the type in which a record is made of the magnitude of a condition by the actuating of record-producing means, the combination of a balanceable-measuring circuit, said circuit including an adjustable impedance, a motor, means including a motor responsive to unbalance of said circuit for adjusting said impedance in a direction to balance said circuit, said motor having a stator, means for pivotally mounting said stator, the reaction torque on said stator upon energization of said motor being effective to tend to move it from a neutral position, said reaction torque varying from a substantial magnitude with unbalance to a low value as circuit balance is attained, and means responsive to decrease of said reaction torque to said low value for controlling the actuation of said record-producing means to produce said record.

10. In a recorder of the type in which a record is made of the magnitude of a condition by the actuating of record-producing means, the combination of a balanceable-measuring circuit, said circuit including an adjustable impedance, a motor, means including a motor responsive to unbalance of said circuit for adjusting said impedance in a direction to balance said circuit, said motor having a stator, means for pivotally mounting said stator, the reaction torque on said stator upon energization of said motor being effective to tend to move it from a neutral position, said reaction torque varying from a substantial magnitude with unbalance to a low value as circuit balance is attained, means responsive to decrease of said reaction torque to said low value for controlling the actuation of said record-producing means to produce said record, and means for momentarily delaying operation of said last-mentioned means to prevent actuation of said record-producing means upon occurrence of transient circuit-balancing conditions.

No references cited